Figure 1:
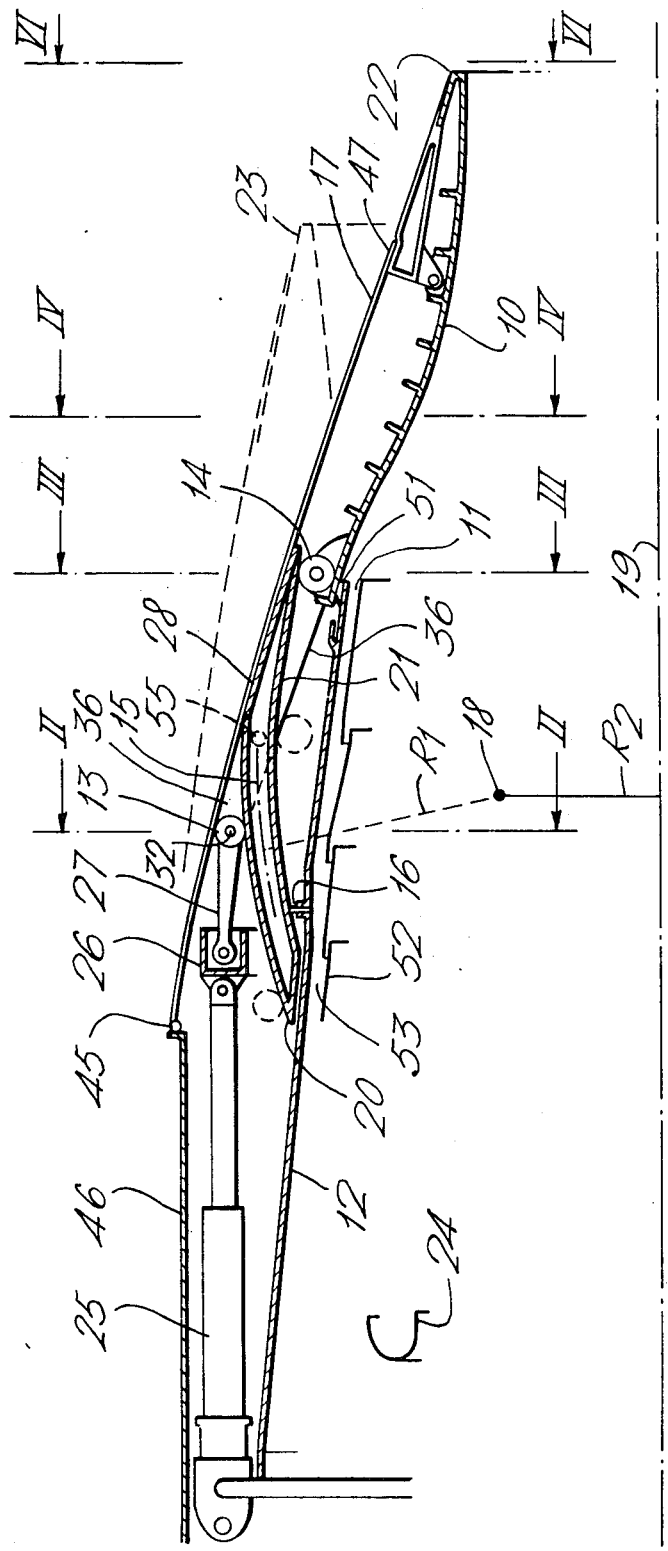

United States Patent [19]

Nightingale

[11] 4,049,199
[45] Sept. 20, 1977

[54] NOZZLES FOR GAS TURBINE ENGINES

[75] Inventor: Douglas John Nightingale, Bristol, England

[73] Assignee: Rolls-Royce (1971) Limited, England

[21] Appl. No.: 676,411

[22] Filed: Apr. 13, 1976

[30] Foreign Application Priority Data

May 9, 1975 United Kingdom ............... 18889/75

[51] Int. Cl.² .............................................. B64C 15/02
[52] U.S. Cl. ................................................ 239/265.39
[58] Field of Search ...................... 239/265.11, 265.19, 239/265.33, 265.37, 265.39, 265.41; 244/42 DA; 60/228, 232, 271

[56] References Cited

U.S. PATENT DOCUMENTS

| | | | |
|---|---|---|---|
| 2,870,600 | 1/1959 | Brown | 239/265.41 X |
| 3,004,385 | 10/1961 | Spears, Jr. et al. | 239/265.41 |
| 3,386,248 | 6/1968 | Pike et al. | 239/265.33 X |
| 3,599,875 | 8/1971 | Wynosky et al. | 239/265.41 |
| 3,778,009 | 12/1973 | Jones | 244/42 DA |
| 3,814,325 | 6/1974 | McCardle, Jr. et al. | 239/265.39 |

Primary Examiner—Evon C. Blunk
Assistant Examiner—Andres Kashnikow
Attorney, Agent, or Firm—Stevens, Davis, Miller & Mosher

[57] ABSTRACT

A variable area convergent/divergent iris nozzle for a gas turbine engine has a plurality of interdigitated master and slave petals. Each master petal has a pair of axially spaced rollers which run on guide tracks mounted on the engine jet pipe. A pivotable link connects the upstream end of each master petal to a unison ring which is axially movable to translate the petals thereby varying the area of the nozzle.

7 Claims, 7 Drawing Figures

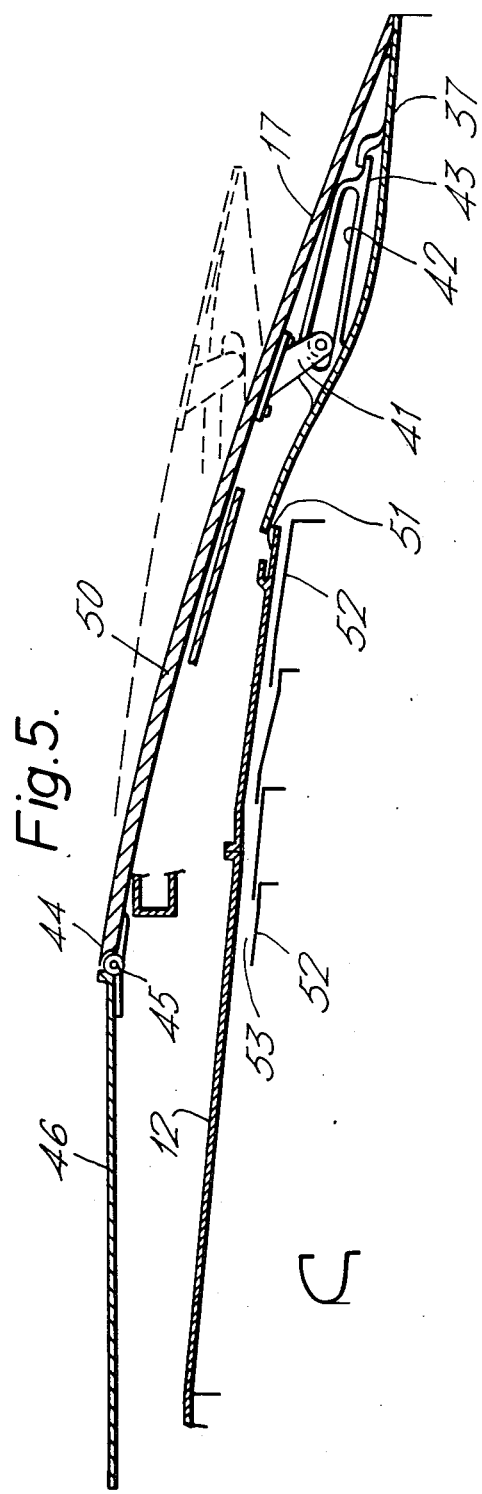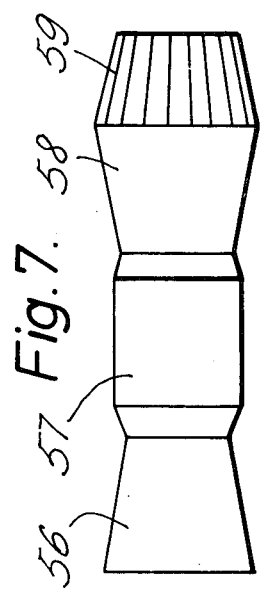

NOZZLES FOR GAS TURBINE ENGINES

The present invention relates to nozzles for gas turbine engines and has particular reference to a variable area convergent-divergent discharge nozzle suitable for use with engines capable of propelling aircraft at supersonic speeds.

Variable area convergent-divergent nozzles are known in the art which comprise a circumferential array of axially extending nozzle petals arranged around the circumference of the gas discharge duct of a gas turbine engine. The nozzle petals are alternately master petals inter-digitated with slave petals and the petals are connected together wither through a slotted or an overlapping arrangement whereby relative movement of the master and slave petals is possible to allow for area variation of the nozzle.

It is known to provide area variation of the above described type of nozzle by connecting the upstream ends of the petals to a common ring which is movable axially of the nozzle, while a roller and guide arrangement between each petal and fixed nozzle structure causes simultaneous privoting of all the nozzle petals. Such nozzles are known as iris nozzles.

It is also known to curve the radially inner walls of each nozzle petal so that the movement applied to the petals, permits simultaneously a change in nozzle throat area and a gradual change of nozzle configuration between convergent and convergent-divergent configurations.

It is a continuing problem in the design of final discharge nozzles for gas turbine engines to provide relatively increasingly lighter nozzles of relatively economic construction.

According to the present invention there is provided a variable area nozzle for a gas turbine engine comprising, a circumferential array of nozzle petals arranged about the discharge opening of a jet pipe, there being in respect of at least some nozzle petals respective curved guide tracks mounted on the jet pipe and respective pairs of axially spaced apart rollers mounted on these nozzle petals, the rollers being arranged to roll on the respective tracks to cause pivoting of the nozzle petals to vary the nozzle outlet area as the petals are moved in a direction generally axially of the jet pipe, the nozzle further comprising actuating means for causing said movement and links pivotally connecting the actuating means to the nozzle petals.

In one embodiment of the invention the upstream roller of each pair runs on a radially outer surface of one of the curved tracks and the downstream roller of the pair runs on a radially inner surface of the other curved track.

Preferably the circumferential array of nozzle petals comprises interdigitated master and slave petals in which only the master petals are provided with said respective pairs of rollers and the movement of the master petals results in a corresponding movement of the slave petals.

The two curved tracks for each nozzle petal may be formed on a single track member and the track members may be inter-connected by a structure surrounding the jet pipe whereby radially outward loads exerted on the curved tracks by the downstream rollers are born at least partially by tension in said structure.

Fairing flaps may be supported from structure upstream of the discharge opening of the nozzle whereby the downstream ends of the fairing flaps are in sliding contact with the downstream end of the discharge nozzle and the fairing flaps are interdigitated so that a smooth profile is achieved between structure surrounding the jet pipe of the engine and the discharge opening of the nozzle.

Figure 2:
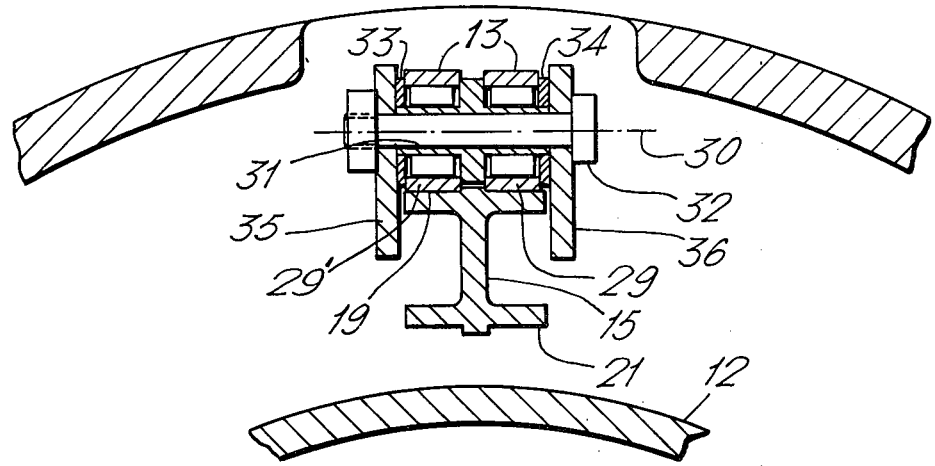
Figure 3:
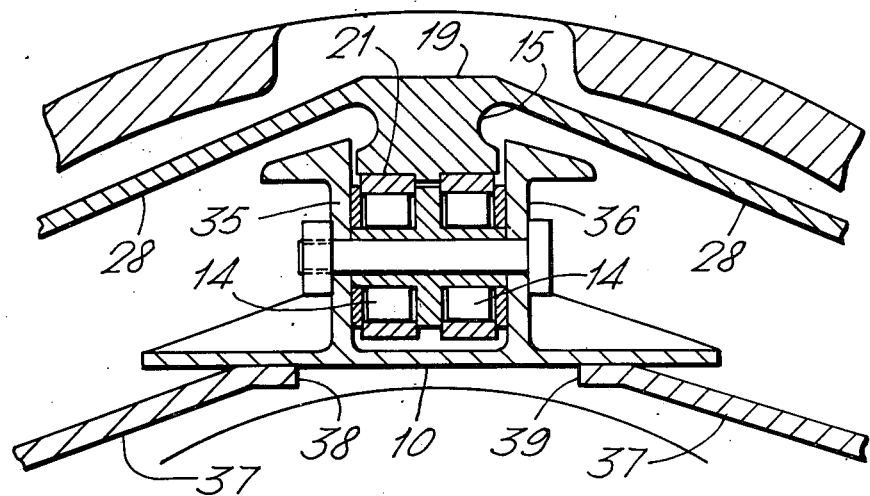
Figure 4:
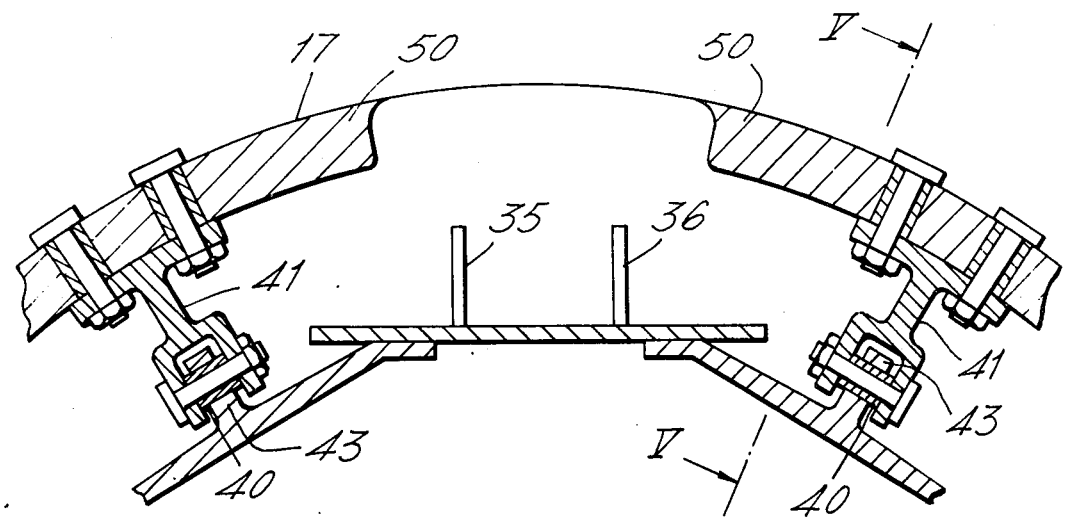
Figure 6:
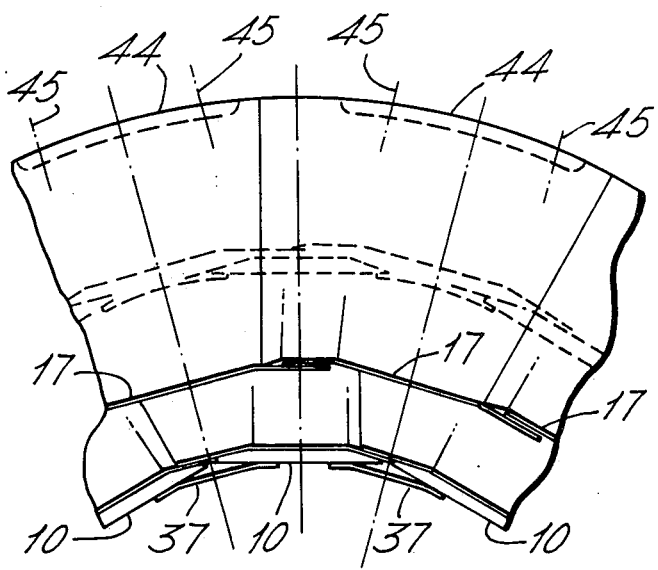

Embodiments of the invention will now be described by way of example only and with reference to the accompanying drawings in which, FIG. 1 is a sectional view through a master nozzle petal FIG. 2 is a section on the line II—II of FIG. 1 to an enlarged scale FIG. 3 is a section on the line III—III of FIG. 1 to an enlarged scale FIG. 4 is a section on the line IV—IV of FIG. 1 to an enlarged scale FIG. 5 is a sectional view through a slave nozzle petal FIG. 6 is an elevation of the discharge opening of the nozzle taken on the line VI—VI of FIG. 1

FIG. 7 is a diagrammatic representation of a gas turbine engine incorporating the present invention.

Referring now to FIG. 1 there is shown a sectional view through one master petal 10 of a circumferential array of nozzle petals arranged about the periphery of the discharge opening 11 of a jet pipe 12. Attached to the master petal is a pair of rollers 13, 14 both of which engage a track on a curved track member 15 fixedly mounted to the jet pipe 12 by a flange 16.

The complete nozzle has twelve master petals and twelve interdigitated slave petals. The nozzle petals and their associated operating mechanism is enclosed by a circumferential array of overlapping fairing flaps 17 which will be later described in further detail. There is provided one curved track member 15 in respect of each master petal, each track member being of radius of curvature $R_1$ and all the centres of curvature of the curved track members lie equally spaced apart on a circle 18 of radius $R_2$ formed about the centre line 19 of the jet pipe.

The rollers 13, 14 are attached to the master petal in such a way that the upstream roller 13 contacts a track 20 on the radially outer surface of the curved track member and the downstream roller 14 contacts a track 21 on the radially inner surface of the curved track.

In operation the master nozzle petal is movable simultaneously with the other master petals from a convergent configuration in which the nozzle throat is formed at the final discharge end 22 of the nozzle, to a convergent-divergent configuration 23 (shown in broken lines) in which the nozzle throat is formed at the end of the discharge opening 11 of the jet pipe 12.

This allows the engine performance to be matched to the flight requirement of the aircraft in which it is installed. Thus in well known manner the nozzle petals can be in a position defining a convergent small exit area nozzle for subsonic cruise conditions of the aircraft and can be positioned to define a maximum throat area convergent-divergent nozzle for supersonic flight conditions in which the nozzle flow is augmented by burning additional fuel in the jet pipe downstream of the reheat gutter 24.

Movement of the master nozzle petals is achieved by four re-circulating ball screw jacks 25 (only one shown) which are operated in turn via air motors (not shown) and which co-operate to move a unison ring 26 axially along the jet pipe.

The unison ring 26 is connected to each master petal by a respective pivoted link 27 which connects to the master petal on the axis 30 of the upstream roller 13 as can be seen in more detail in FIG. 2. Referring now to FIG. 2 it will be seen that the roller 13 comprises a pair of roller bearings 29, 29' mounted via an inner race 31 on a cross shaft 32. The downstream end of the link 27 is split into two plates 33, 34 through both of which the shaft 32 passes.

On either side of the two plates 33, 34 are respective side plates 35, 36 which are part of the master petal and which serve also to support the downstream roller 14 as will be later explained with reference to FIG. 3. Gas pressure within the nozzle acting on the master petal presses the downstream roller 14 against the curved track 21 and the upstream roller 13 against the curved track 20 and there is a net radially outward load applied to curved tracks. This radially outward load, which it will be understood is not exceptionally severe because of the arrangement of the rollers, is born by tension in a polygonal skin 28 which connects the twelve curved track members 15 together around the periphery of the nozzle. This polygonal skin 28 can be seen in more detail in FIG. 3 which shows how the downstream roller 14 which, like the upstream roller 13 comprises a pair of roller bearings, is connected to the master petal by the same side plates 35 and 36 as support the upstream roller 13.

To either side of the master petal 10 can be seen conventional slave petals 37 whose side edges 38, 39 can slide relative to the master petal 10 to permit variation of the nozzle exit area and may be locally grooved to receive the edges of the master petals. The local groove is preferably disposed at the reheat throat position to minimise mis-alignment at the throat due to thermal expansion effects. The slave petals are connected to the outer fairing flaps 17 as can be seen in more detail from FIGS. 4 and 5.

From FIGS. 4 and 5 it will be understood that rollers 40 supported by respective yokes 41 attached to the fairing flaps 17 run in respective inclined grooves 42 in radial outwardly extending flanges 43 attached one to each slave petal 37. In this manner the slave petals 37 move together with the fairing flaps 17 which themselves move as the master petals 10 are actuated.

The fairing flaps, which can be further seen in FIGS. 6 and 7 and of which there are twenty four in the complete nozzle, are each connected at their upstream ends 44 by hinges 45 to structure 46 which surrounds the jet pipe 12. This structure may be either aircraft or engine structure and the fairing flaps allow the outer surface of the nozzle to blend smoothly with said structure 46 and thus to converge in a conventional boat tail angle for the avoidance of base drag. At their downstream ends the fairing flaps surround and lie flush with the outer surface of the master and slave petals in the nozzles convergent position, but are free to lift and slide over the outer periphery of the petals until in the convergent-divergent configuration 23, the downstream ends of the fairing flaps coincide with the downstream ends of the petals.

The fairing flaps are made from a lightweight honeycomb 50.

At the end of the jet pipe 12 there is provided an annular seal 51 which bears on the master and slave petals and substantially prevents leakage of propulsive gases.

A reheat liner 52 is maintained in a concentric position within the jet pipe 12 and in known manner is cooled by a flow of relatively cool air which flows along the annular passage 53 formed between the reheat liner 52 and the jet pipe 12. This flow of cooling air also film cools the master and slave petals.

A spigot or detent 55 is carried by each master petal and which engages the track member 15 to prevent the petals falling inwards when the engine is not operating.

FIG. 7 is a diagrammatic view of a gas turbine engine having the usual compressor section 56, combustion section 57 turbine section 58 and the final nozzle 59 of which is constructed as described above.

Whilst in the embodiment of the invention described the slave petals have been shown to be operated by the fairing flaps it is equally possible to use other known methods of operating them from the master petals.

Nozzles designed in accordance with the invention are lighter than the known iris nozzles. The main reason for this is that, the introduction of the additional link 27 between the upstream ends of the nozzle petals and the unison ring 26, frees the upstream end of each nozzle petal from axial constraint and allows radial movement of the upstream roller 13. Thus greater pivoting of the petals and hence greater nozzle area variation can be achieved with a much shorter stroke of the actuating jacks 25. Although the jack loads may be higher a net reduction in work done can be achieved so that the power required from the air motors which operate the jacks is reduced and the air motors become significantly smaller.

By having two axially spaced rollers on the petals and by forming the two tracks on a single track member the hoop loads in the tracks due to gas pressure on the flaps are reduced and the overall weight of the track members are reduced. A further benefit is that the gas pressure loads being taken via the two axially spaced rollers into the track member and the polygonal skin, the bearings and actuator mechanism of the unison ring are relieved of the load.

The inclusion of the lightweight fairing flaps in the total combination allows for the final boat-tail angle of the nozzle to be maintained at a valve between 15° and 20° to the axis of the nozzle so that there is no ambient air flow over the reverse curvature of the petal flaps themselves. Thus the reverse curvature can be made greater without causing additional drag due to break away of the airflow and the much heavier nozzle petals themselves can be made shorter and a further net saving in weight is achieved.

I claim:

1. A variable area nozzle for a gas turbine engine comprising fixed structure including a jet pipe, a circumferential array of nozzle petals, including certain master petals arranged about the discharge opening of the jet pipe and means supporting the petals for nozzle area varying movement relative to the jet pipe, said means including in respect of at least said master nozzle petals respective pairs of axially spaced apart rollers which engage guide track surfaces supported from said structure, there being, in respect of the upstream roller of each said pair, a radially outwardly facing guide track surface and in respect of the downstream roller of each said pair a radially inwardly facing guide track surface, the radially inwardly and outwardly facing guide track surfaces being mutually inclined for changing the relative petal inclinations on operation of means for simultaneously moving all the said petals along said guide track surfaces, there being further provided structure interconnecting the radially inwardly facing guide track surfaces whereby in operation radially outward loads from the said downstream rollers are borne at least partially by tension in said structure.

2. A nozzle according to claim 1 and wherein said means for simultaneously moving all the said petals along said guide track surfaces comprises in respect of each petal a link means for pivotally connecting one end of the link means to the upstream end of the petal, means for pivotally connecting the other end of the link means to a unison ring and a motor for moving the unison ring axially along the jet pipe.

3. A nozzle as claimed in claim 1 and which further comprises slave petals interdigitated with said master petals and engaging the master petals and being movable responsive to movement of the master petals to vary the area of the nozzle.

4. A nozzle as claimed in claim 1 wherein said radially inwardly and outwardly facing guide track surfaces are formed on opposite sides of a curved member the said radially inwardly facing guide track being disposed generally further downstream than said radially outwardly facing guide track surface.

5. A nozzle as claimed in claim 1 and wherein said structure interconnecting the radially inwardly facing guide track surfaces comprises a ring of sheet metal tie members arranged as a polygon surrounding the jet pipe and having one said guide track surface located at each apex of the polygon.

6. A nozzle as claimed in claim 1 and having a plurality of fairing flaps pivotally connected at their upstream ends to said fixed engine structure and extending downstream into contact with the outer surface of the said nozzle petals, the fairing flaps being adapted for sliding movement relative to said nozzle petals on nozzle area varying movement of said nozzle petals.

7. A variable area nozzle according to claim 6 and wherein the fairing flaps are connected to the slave petals for movement together therewith.

* * * * *